United States Patent [19]

Mainquist et al.

[11] Patent Number: 5,163,540

[45] Date of Patent: Nov. 17, 1992

[54] CONTROL VALVING FOR A TORQUE CONVERTER AND CLUTCH ASSEMBLY

[75] Inventors: James K. Mainquist, Clarkston; Larry T. Nitz, Troy, both of Mich.

[73] Assignee: Saturn Corporation, Troy, Mich.

[21] Appl. No.: 840,481

[22] Filed: Feb. 24, 1992

[51] Int. Cl.⁵ .................. F16H 45/02; F16H 61/14
[52] U.S. Cl. ..................... 192/3.3; 192/3.29
[58] Field of Search ............ 192/3.21, 3.29, 3.3, 192/3.33; 74/730.1, 732.1

[56] References Cited

U.S. PATENT DOCUMENTS

| | | | |
|---|---|---|---|
| 2,736,412 | 2/1956 | Livezey | 192/3.3 X |
| 2,824,632 | 2/1958 | Lucia et al. | 192/3.3 |
| 2,965,202 | 12/1960 | Christenson | 192/3.3 |
| 3,241,399 | 3/1966 | Fisher et al. | 192/3.3 |
| 4,271,939 | 6/1981 | Iwanaga et al. | 192/3.3 |
| 4,828,084 | 5/1989 | Hasegawa et al. | 192/3.3 |
| 4,880,091 | 11/1989 | Hasegawa et al. | 192/3.3 |

*Primary Examiner*—Richard Lorence
*Attorney, Agent, or Firm*—Donald F. Scherer

[57] ABSTRACT

A control valve arrangement for a torque converter and clutch assembly is operable to control the torque converter outlet pressure at one pressure level during clutch engagement and at another pressure level during clutch disengagement.

2 Claims, 1 Drawing Sheet

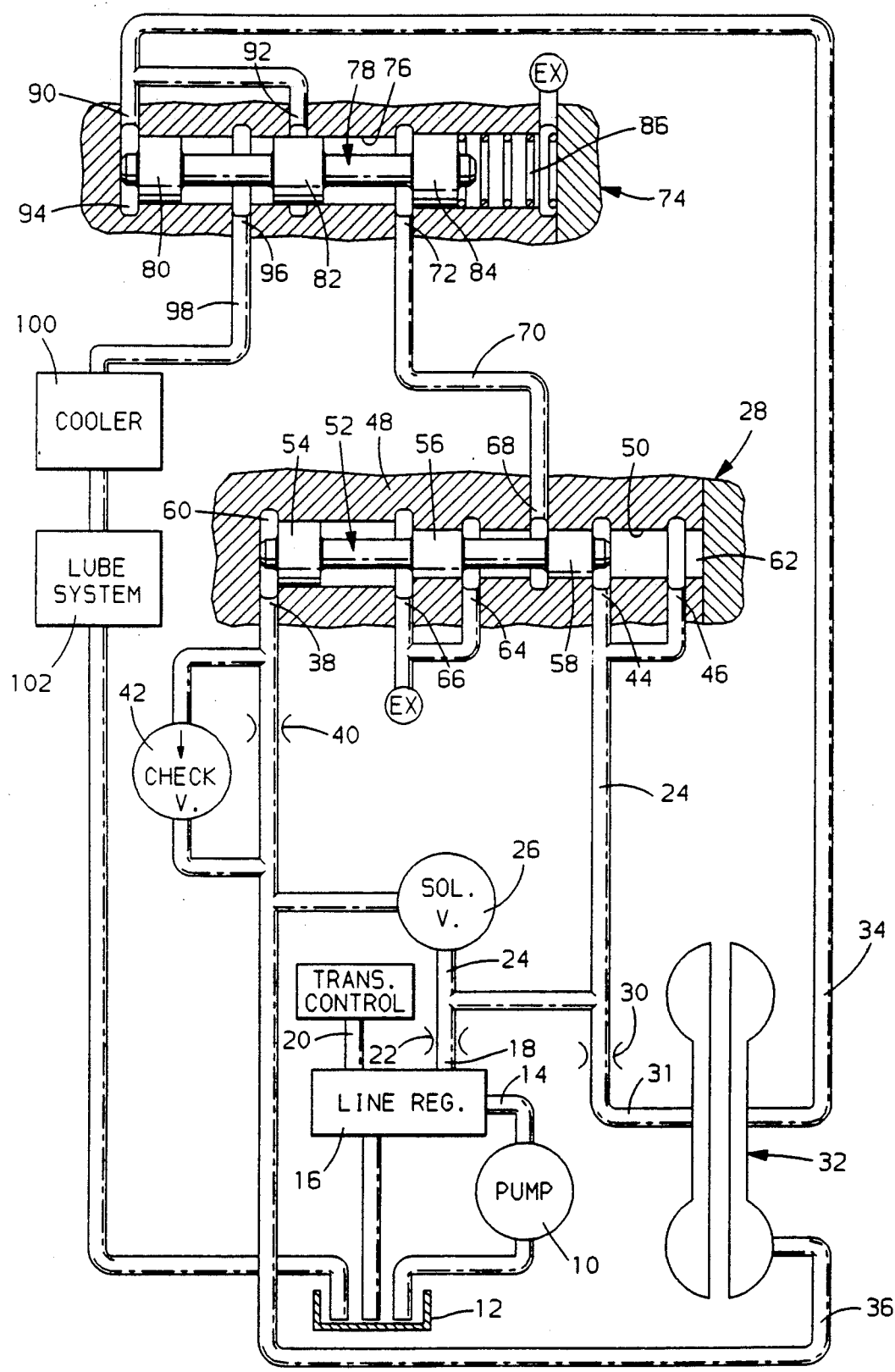

CONTROL VALVING FOR A TORQUE CONVERTER AND CLUTCH ASSEMBLY

BACKGROUND OF THE INVENTION

This invention relates to control systems for torque converters, and more particularly, to pressure control systems for torque converter and clutch assemblies.

Specifically, this invention relates to a valve arrangement for controlling the outlet pressure of a torque converter and clutch assembly in a 3-path control circuit.

Torque converter and clutch assemblies use either a 2-path or 3-path control circuit. In a 2-path control circuit, one passage or path is pressurized for clutch apply while the other is exhausted. For clutch release, the function of the passages is reversed.

In a 3-path system, one path or passage is always the torque converter outlet passage. One passage is always a clutch apply passage and is always pressurized while the remaining passage, a clutch release passage, is selectively pressurized to control the operating condition of the clutch. In these 3-path prior art systems, the same amount of fluid flows through the torque converter (from apply to outlet) regardless of the operating condition of the clutch.

As a general rule, the volume of required fluid flow through the torque converter is determined by the heat to be rejected. Thus, during torque converter operation, large flow volumes are desired, particularly at stall conditions. However, when the torque converter clutch is engaged, the torque converter does not generate heat and less fluid flow is required.

The 2-path system accommodates this changing requirement by switching the input flow part to the converter and connection the outlet to the cooler. During clutch engagement, the flow through the torque converter is restricted by the clutch structure, thus reducing the flow through the torque converter. A 3-path system does not have this advantage and accordingly has higher than required fluid flow, through the torque converter, during clutch engagement. This reduces the overall efficiency of the system.

SUMMARY OF THE INVENTION

The present invention provides a control valve and arrangement for a 3-path system, wherein the fluid flow through the torque converter is controlled to provide a high flow rate during the clutch release mode and a lower flow rate during the clutch engagement mode. The flow rate change is accomplished by increasing the pressure at the torque converter outlet during clutch engagement. To achieve this end, a first valve is actuated at a predetermined pressure level in the clutch release circuit to control the delivery of a clutch condition signal to an outlet pressure control valve. The outlet pressure control valve is effective to produce an increase in the torque converter outlet pressure during clutch engagement and a decrease in the torque converter outlet pressure during clutch release.

It is therefore an object of this invention to provide an improved control valve system for a torque converter and clutch assembly whereby the torque converter outlet pressure is reduced when the clutch is disengaged.

It is another object of this invention to provide an improved control valve system for a torque converter and clutch assembly wherein an outlet pressure control valve has a pilot area which is pressurized by a signal from a torque converter clutch signal valve to effect a reduction in the torque converter outlet pressure.

It is a further object of this invention to provide an improved control valve system for a torque converter and clutch assembly, wherein the outlet pressure is maintained at different values depending upon the operating condition of the clutch.

These an other objects and advantages of the present invention will be more apparent from the following description and drawings.

DESCRIPTION OF THE DRAWING

The drawing is a diagrammatic representation of a torque converter and clutch control mechanism incorporating the present invention.

DESCRIPTION OF AN EXEMPLARY EMBODIMENT

Referring to the drawing, there is seen a schematic representation of a conventional transmission control pump 10 which is operable to draw fluid from a sump or reservoir 12 for delivery through a passage 14 to a conventional line regulator 16 which is effective to establish main line or maximum transmission control pressure in a passage 20, and a torque converter inlet pressure in a passage 18. As is well known, the fluid flow to passage 18 occurs after the pressure and flow requirements of passage 20 are met by the pump 10.

Passage 20 is connected to a conventional automatic transmission control mechanism which is, as is well known, effective to control the engagement and disengagement of the various ratio clutches and brakes which are contained within such transmissions.

The passage 18 is in fluid communication through a restriction 22 with a clutch signal passage 24, which in turn communicates with a conventional pulse width modulated solenoid valve 26 and a torque converter clutch signal valve 28.

The clutch signal passage 24 is also connected via a restriction 30 to a clutch apply passage 31 which is connected to a conventional torque converter and clutch assembly 32 which is shown in a schematic representation. The torque converter and clutch assembly 32 also has connected therewith a torque converter outlet passage 34 and a clutch release passage 36. The clutch release passage 36 is disposed in fluid communication with the pulse width modulated solenoid valve 26 and a port 38 of the torque converter clutch signal valve 28.

The communication with the torque converter clutch signal valve 28 is via a restriction 40 and a convention check valve 42. The check valve 42 and restriction 40 are disposed in parallel flow relationship to prevent rapid fluid flow to the port 38 while permitting rapid exhausting from the port 38. The pulse width modulated solenoid valve 26 is operable to establish the fluid pressure in the clutch release passage 36 at zero or a low value when clutch engagement is desired and at a high value when clutch release is desired. The operation of such valves is well known. The use of a duty cycle or pulse width modulated valve permits accuracy in controlling the pressure in passage 36 between the engaged and disengaged modes of the torque converter clutch. It will be appreciated that the pressure at port 38 will therefore be at a high value during clutch release and at a low value during clutch apply.

The clutch signal passage 24 is also connected for fluid communication with the torque converter clutch signal valve 28 at a pair of spaced ports 44 and 46. The torque converter signal valve 28 includes a valve body 48 in which is formed a stepped diameter valve bore 50 which in turn accommodates a slidingly disposed stepped diameter valve spool 52. The valve spool 52 has a large diameter land 54 and a pair of spaced smaller equal diameter lands 56 and 58. The large diameter land 54 cooperates at a left end of valve bore 50 to provide a control chamber 60 which is disposed in fluid communication with the port 38. The land 58 cooperates with the right end of the valve bore 50 to establish a control chamber 62 which is continuously in fluid communication with the port 46 and in selective fluid communication with the port 44.

The valve bore 50 has two exhaust ports 64 and 66. The exhaust port 66 continuously exhausts the area between the valve lands 54 and 56 while the exhaust port 64 selectively exhausts the area between the valve lands 56 and 58. The valve bore 50 has a further port 68 which is disposed in fluid communication with a pressure signal passage 70 which in turn is connected to a port 72 of a torque converter outlet pressure control valve 74. The port 68 is selectively connected between lands 56 and 58 with either the exhaust port 64, as shown, or with the port 44 when the valve spool 52 is shifted rightward by control pressure at the control chamber 60.

Thus, the port 72 of valve 74 is either exhausted or connected to the clutch signal passage 24 through the valve 28. Since the clutch signal passage 24 is continuously pressurized and the control chamber 60 is pressurized during clutch release, the pressure signal passage 70 and therefore port 72 will be pressurized whenever the torque converter clutch is released.

The torque converter outlet pressure control valve 74 includes a stepped diameter valve bore 76 in which is slidably disposed a stepped diameter valve spool 78 having a pair of spaced equal diameter lands 80 and 82 and a larger diameter land 84. The differential area between the land 82 and large land 84 is in fluid communication with the port 72 and is therefore pressurized or exhausted as described above.

A compression spring 86 is disposed between the right end of valve bore 76 and the valve land 84 to continuously urge the valve spool leftward in the valve bore 76. During clutch release, when the pressure in the pressure signal passage 70 is high, the force on the differential area between valve lands 84 and 82 will be in a direction to assist in overcoming the force in spring 86.

The valve bore 76 has a pair of ports 90 and 92 which are connected for fluid communication with the torque converter outlet passage 34. The valve land 80 cooperates with the bore 76 to provide a control chamber 94 which is in fluid communication with the port 90. Fluid pressure in the control chamber 94 will move the valve spool 78 rightward against the spring 86 to permit the fluid in the torque converter passage 34 to communicate via port 92 and a port 96 with a cooler passage 98. The cooler passage 98 directs fluid through a conventional cooler 100 and the lube systems 102 of the transmission from which it returns to the sump 12.

The pressure in the torque converter outlet passage 34 is determined by the valve 74. When the signal passage 70 is exhausted (i.e., torque converter clutch engagement), the only force available to open the valve 74 is the pressure in control chamber 94. Thus, a high pressure is required to overcome the force in the spring 86.

When the torque converter clutch is released, thereby increasing the pressure in the clutch release passage 36, the signal passage 70 will be pressurized thereby providing an additional force within the control valve 74 to assist in overcoming the force in the spring 86. The addition of the force on the differential area between valve lands 84 and 82 will permit a reduction in the fluid pressure required in the control chamber 94 thereby reducing the pressure required in the torque converter outlet passage 34.

As described above, the pressure in the torque converter outlet passage will be at a low value during torque converter release and at a high value during torque converter apply. Thus, the fluid flow through the torque converter will be at a relatively high level during clutch release and at a relatively lower level during clutch apply. This is primarily due to the clutch apply passage being maintained at a fixed pressure level and a torque converter outlet passage being maintained at two distinct pressure levels, as is well known when the pressure differential across a torque converter or essentially any fluid device changes the fluid flow through the device will also change.

Since the area of land 54 is greater than the area of land 58, the valve spool 52 will shift prior to the attainment of full clutch release pressure in passage 36. Thus, the torque converter outlet pressure will begin to rise prior to the torque converter clutch being fully released. The pulse width modulated valve 26 can be controlled to establish the timing of the rise in torque converter outlet pressure and the full disengagement of the clutch.

Thus, the present invention provides a simple yet effective valving arrangement to establish the desired flow characteristics within a torque converter and clutch assembly.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A control for directing pressurized fluid to and from a torque converter and clutch assembly comprising: a clutch apply passage; a clutch release passage; a torque converter outlet passage; a source of fluid pressure means operatively connected with said clutch apply passage for establishing a pressure level therein; a duty cycle solenoid means disposed between said source and said clutch release passage for selectively establishing fluid pressure levels in the clutch release passage; a clutch signal valve means operatively connected with said clutch apply passage and said clutch release passage for providing an output pressure signal when a pressure level in the clutch release passage is at or above a predetermined ratio of the pressure level in the clutch apply passage; and torque converter outlet pressure valve means for establishing a pressure level in the torque converter outlet passage in response to the output pressure signal.

2. A control for directing pressurized fluid to and from a torque converter and clutch assembly comprising: a clutch apply passage; a clutch release passage; a torque converter outlet passage; a source of fluid pressure means operatively connected with said clutch apply passage for establishing a pressure level therein; a solenoid valve means disposed between said source and said clutch release passage for selectively establishing a high fluid pressure level and a low fluid pressure level in the clutch release passage; a clutch signal valve means operatively connected with said clutch apply passage and said clutch release passage for providing an output pressure signal when the high pressure level is present in the clutch release passage; and torque converter outlet pressure valve means including an outlet pressure control chamber and a differential pressure control area for establishing the pressure levels in the torque converter outlet passage in response to the output pressure signal and the pressure in the torque converter output passage.

* * * * *